Oct. 29, 1968 W. W. LEE ETAL 3,408,634

OPTICAL MEMORY SYSTEM

Filed Jan. 8, 1964 2 Sheets-Sheet 1

INVENTORS
WALTER W. LEE
ARTHUR S. ROBINSON
DAVID H. BLAUVELT
ISRAEL L. FISCHER
BY Constantine A. Michalos
ATTORNEY INVENTORS
WALTER W. LEE
ARTHUR S. ROBINSON
DAVID H. BLAUVELT
ISRAEL L. FISCHER
BY Constantine A. Michalos
ATTORNEY United States Patent Office 3,408,634
Patented Oct. 29, 1968

3,408,634
OPTICAL MEMORY SYSTEM

Walter W. Lee, Allendale, N.J., Arthur S. Robinson, South Huntington, N.Y., David H. Blauvelt, Ridgewood, and Israel L. Fischer, Harrington Park, N.J., assignors to The Bendix Corporation, Teterboro, N.J., a corporation of Delaware Filed Jan. 8, 1964, Ser. No. 336,487
5 Claims. (Cl. 340—173)

Figure 1:
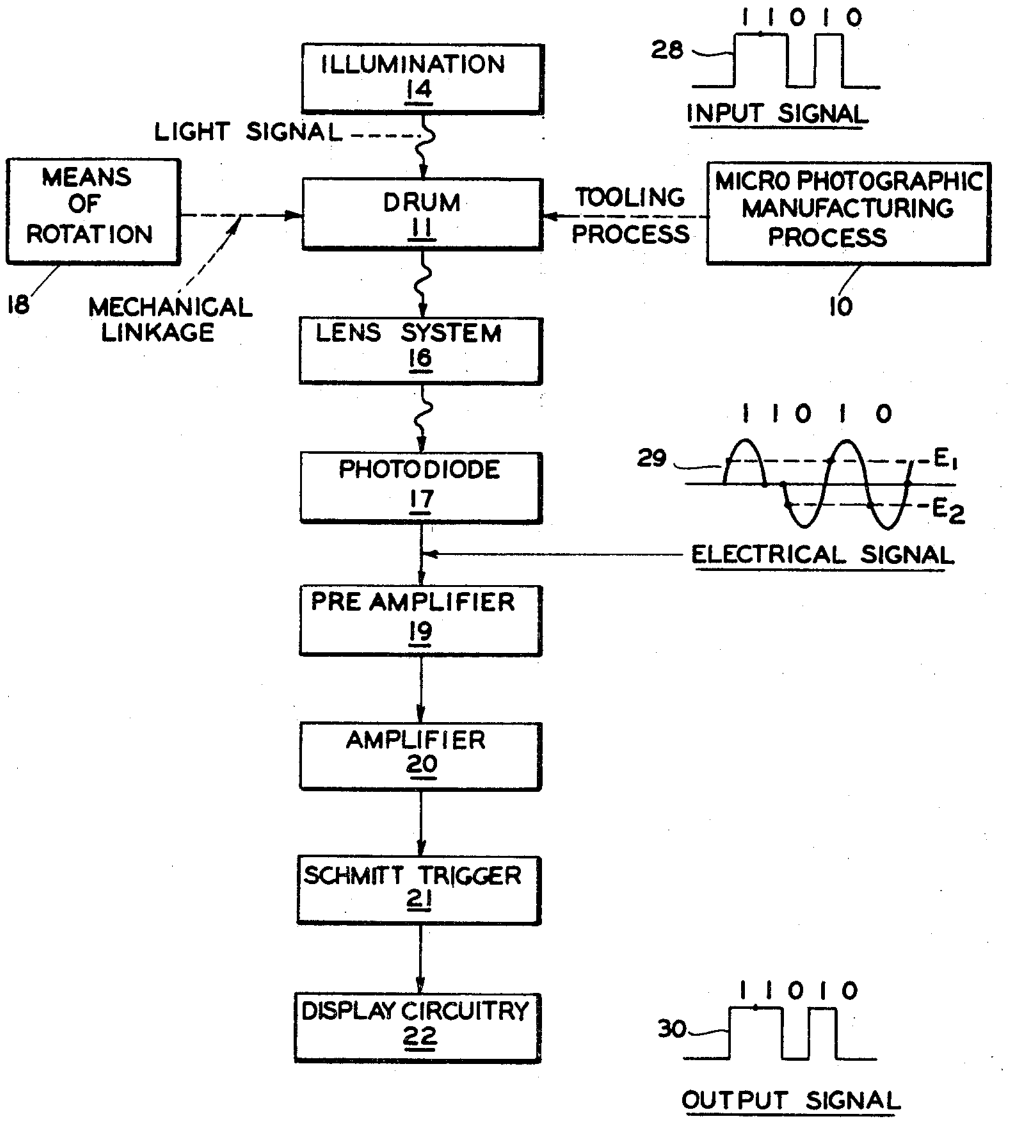

This invention relates to digital computers, and particularly to an optical memory system having high density, large capacity, and permanent storage for use in aerospace digital computing control systems.

Heretofore, it has been the practice to use magnetic memory systems for digital computer bulk memory systems utilizing magnetic drums or cores or punched tapes. Sophisticated aerospace needs present a problem to the computer memory art, since the storage capacity requirements necessitate a system's storage density not anticipated or efficiently solved by the present day computers. As the program length increases, with mission complexity, the common magnetic bulk memory devices cannot handle the storage capacity needed without invalidating the basic needs of an efficient computer having high storage density, fast resolution rate, small size and light weight. In the present day magnetic memory systems, the memory devices that have high storage efficiency have inherently long access time. Conversely, memory devices which have fast random access times have low bit densities and hence poor storage efficiencies. The utilization of the former devices sacrifices computation speed, and therefore, severely limits the operation of the arithmetic unit for the sake of capacity, while the use of the latter, inherently faster devices dictates that large capacity can only be obtained at the price of increased size and weight. The systems became too bulky to be applied to the aerospace field where information in the range of one million bits of information may be desired. In addition, the present day magnetic memory drums are unsatisfactory for aerospace use because they have a disadvantage of being sensitive to stray electric and magnetic fields which caused inaccuracies, and therefore produced a memory system having an additional disadvantage in inefficient permanent memory storage.

The solution of the problem lies in providing an optical memory system which utilizes the combination of the desirable features of high storage efficiencies found in magnetic drums or tapes with the fast random access times found in magnetic core arrays. Since the aerospace computer system is designed specifically for its intended application, its program and significant portions of other stored data are permanent in nature. This permits the substitution of optical techniques for magnetic techniques in the design of the storage memory system. The use of an optical device which has a much higher packing density and permanent storage results in a more reliable memory system. Therefore, the optical device can be made smaller in size and weight than its equivalent magnetic counterpart.

It is an object of this invention to provide a system to compress the size of computing and control systems for aerospace missions by applying the techniques of microphotography and microphotoetching to encode stored information.

Another object of this invention is to provide an optical memory technique for the permanent storage of long programs needed in the computation and control systems of aerospace missions.

Another object of this invention is to provide an optical memory system having a high storage efficiency, fast random access and insensitivity to stray electric and magnetic fields by providing storage means using a glass drum, and photographically microphotoetching its surface with encoded information.

A further object of this invention is to provide an optical memory system having a glass drum on which is stored information by means of a programming and indexing system, which drum can be read by interposing it between an optical means, such as a light source and a reading head device, such as a photodetector.

An additional object of this invention is to provide an optical memory system having a fast solution rate, high packing density, and minimal size and weight.

These and other objects and features of the invention are pointed out in the following description in terms of the embodiment thereof which is shown in the accompanying drawings. It is to be understood, however, that the drawing is for the purpose of illustration only and is not a definition of the limits of the invention.

Figure 2:
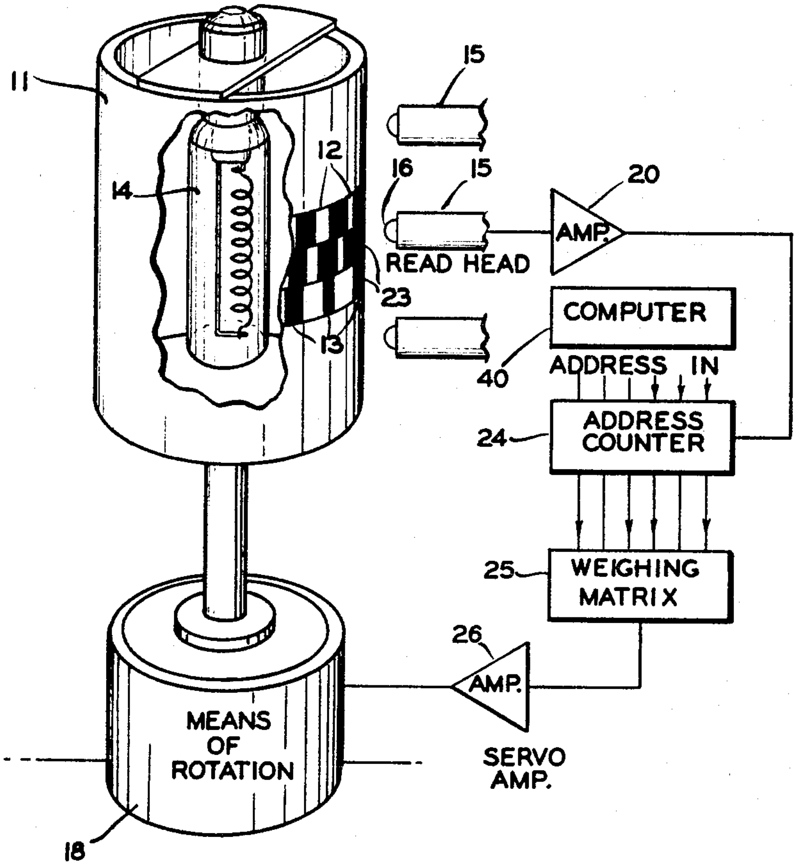

In the drawings:

FIGURE 1 shows a block diagram of the optical memory digital computing control system in accordance with a preferred embodiment of this invention; and FIGURE 2 shows an elevational schematic view of the invention with parts broken away to show detail.

Referring now to the drawing, it is illustrated that a microphotographic manufacturing process 10 is used to inscribe the compiled information from several punched tapes onto a master tape (not shown) and then onto a first optical means such as a light permeable glass drum 11. The glass drum 11 is very similar to a magnetic memory drum except that it is a glass cylinder and, as shown in FIGURE 2, the information is stored as clear areas 12 and opaque areas 13 on a photographic emulsion rather than as the direction of magnetization of a magnetic coating. The information pattern is such that the clear and opaque areas correspond to the "zeros" and "ones" of the binary system.

This pattern is illuminated from the interior of the drum by a light emanating from a central light source 14. Read heads 15 are located on the exterior of the drum and comprise a lens system 16 and a photodetector such as a photodiode 17, shown in FIGURE 1. The light source 14, lens system 16, and photodiode 17 are used to read out the stored information pattern on the drum 11. It should be noted that the illuminated pattern can be given a large linear magnification in an extremely short distance by the lens. The magnified image is focused on the sensitive areas of the photodiode and depending on whether a "zero" or "one" of the pattern covers the sensitive area, the photodiode does or does not cause a current to flow. The drum 11 is rotated between the light source 14 and the read heads 15 by a means of rotation 18 such as a resolver, synchro or highspeed precision motor.

As shown in FIGURE 2, the light source 14 is positioned centrally within the drum 11 for optimum output in all directions and for pick-up of the compiled information by the readout optical system comprising the lens system 16 and the photodiode 17. As the drum 11 is rotated between the light source and the read heads, the clear and opaque pattern will pass in front of the read heads to change photodetector current flow. As shown by the block diagram of FIGURE 1, the change in the current is amplified by a preamplifier 19 and amplifier 20 and then shaped by a Schmitt trigger 21 to produce the appropriate voltage level to a display circuitry 22.

A typical display may consist of a series of lights, one light corresponding to each channel encoded on the drum. The light may be illuminated to indicate in conventional computer language a one under the read head of the corresponding channel and the light may be extinguished to indicate a zero.

As illustrated in the drawing of FIGURE 2, the glass drum 11, having predetermined microimages microphotographically etched information pattern on its surface is mechanically linked to the means of rotation 18. The drum itself is a high precision quality optical piece and the microimages are stored in binary form on its surface as clear and opaque areas as hereinbefore described. The drum is preferably made of lime glass, annealed to remove residual stresses and polished to a required close tolerance. The drum is microphotographically encoded by a fully automatic manufacturing process with all steps interlocked to ensure prime accuracy. The pattern comprises circumferential parallel tracks 23 around the drum, covering the length of the drum except for the mounting area. The binary digits are represented by opaque areas 13 for "ones" and transparent areas 12 for "zeros." In order to preserve this accuracy, therefore, the drum 11 is very accurately mechanically linked to the means of rotation 18. One means for obtaining accurate rotation is by use of a hysteresis synchronous motor, allowing for a high stability rotational speed without slip rings or brushes. To accomplish this accuracy, the drum is encoded with the required binary data, while it is mounted on the motor's armature to ensure concentricity of the binary pattern with the axis of rotation.

The illuminating system 14, as shown in FIGURE 2, utilizes a special incandescent lamp to supply the necessary light for the memory system readout through the drum. In the readout optical system, in order that the lens system 16 optically follow the glass drum 11 and allow for readout accuracy, the lens may be slightly offset with respect to its mounting or otherwise suitably regulated in order that it can be adjusted to be aligned with the photodetector axis. The photodetector 17 is placed behind the lens at a predetermined focal length in order that the pattern on the drum may be magnified onto the photodetector in a typical magnification of fifteen times, resulting in the electronic signal. The drum is rotated between the light source and the readout optical system for either continuous or incremental rotation from one microimage to the other which may be an opaque area or a transparent area.

In this optical memory system, the high bit density requires high frequencies; and since the normal performance of the photodiode is not satisfactory at higher frequencies, it is proved necessary to insert the amplifier 20 where the frequency characteristics exactly compensate for the characteristic of the photodiode 17. In addition, as shown by the block diagram of FIGURE 1, because of the high output impedance of the photodiode 17, the preamplifier 19 should have a high input impedance in order to obtain maximum signal-to-noise ratio. Following the amplifier 20, after the change in current is amplified by the preamplifier 19 and the amplifier 20 circuits, the system provides for the Schmitt trigger 21 which is utilized to combine the response of the preamplifier 19 and the photodiode 17 to provide a characteristic which gives an electronic output which is identical to that of the light signal input. The optical system is normally used in conjunction with the display system 22 which takes the shaped pulses coming out of the Schmitt trigger and applies the techniques of magnetic wave shaping for displaying it to the optical system.

The techniques of "magnetic wave shaping" refer to those electronic techniques applied to the signals from the storage drum in order to render these signals compatible with those useable in electronic computers. These techniques are well known and of every day usage in computer techniques as explained in Handbook of Automation Computation and Control, volume 2, chapter 19, by Crabb, Ramo and Woolridge, published by John Wiley and Sons, New York, 1959.

The operation of the optical memory system is very similar to a magnetic drum memory system. It utilizes a high speed rotating drum, however, the drum in this invention is a glass cylinder and the information is stored on its surface in clear and opaque areas rather than in the direction of magnetization of a magnetic coating. The information inscribed on the glass drum 11 by the microphotographic etching techniques provided by the drum manufacturing device may be permanently stored for future use and may be available for reading by the photo memory system.

In summary, the operation of reading the glass drum by the system is as follows:

The drum 11, encoded with the required binary data, is mounted on the means of rotation 18 which may be a hysteresis synchronous motor, which provides a high stability of rotational speed without slip rings or brushes, in a small motor size. The drum is directly attached to the motor armature to ensure concentricity of the binary pattern with the axis of rotation. The armature serves as a mechanical reference during the actual application of the pattern and any mounting error is thus washed out during this readout procedure.

As brought out before, the means of rotation may comprise a resolver or a synchro. As shown in FIGURE 2, in order that the drum 11 rotate to a predetermined position, an input signal is applied by a computer 40 of a conventional type into an address counter 24 also of a conventional type. The computer 40, through its signal, determines the direction and the number of bits the drum 11 is to be rotated. The address counter 24 describes how far the drum 11 is from the desired position. By means of a digital to analog converter of a conventional type, such as a suitable weighing matrix 25, an error signal is generated thereby, whose magnitude is equal to the angle of rotation or the number of bits the drum 11 is to rotate. By means of a suitable servo amplifier 26, the means of rotation 18 effects rotation of the drum 11 to the predetermined position. As the drum 11 rotates, the track 23 on drum 11 passes under the read head 15.

For each bit of information that passes the read head 15, the number in the address counter 24 is decreased by one. This decreases the magnitude of the error signal and slows down the means of rotation 18 in such a manner that the drum 11 will stop rotating at the desired position. Suitable stabilization is provided in a conventional manner so that when the drum 11 is at the desired or zero position, it cannot advance accidently. In this position, an input light signal 28 from the illumination means 14 is directed through the glass drum 11 while the drum is held by the means of rotation 18 at the selected position. The light signal 28 leaving the drum is then focused on the photodetector 17 by the lens 16 which transforms the light signal into an electric signal 29 to be picked up and amplified by the preamplifier 19 and the amplifier 20. The signal is then shaped by the Schmitt trigger 21 to produce the appropriate voltage levels. The display system 22 accepts the selected incremental data and displays the information stored there which is an output signal 30 identical to that of the light input signal 28. The means of rotation then advances the drum to the next selected position and the readout cycles are repeated to read out any amount of information desired from the drum. The drum can also be read continuously by continuously rotating and reading the variations from opaque to clear areas.

The drum 11 may be read either while moving or while stationary. In either case one bit of the signals 28, 29 and 30 of FIGURE 1 is present in each channel. If the drum 11 is moving the light signal 28, the electrical signal 29 and the output signal 30 will appear sequentially as shown in FIGURE 1. If drum 11 is stationary it will be as though one bit had been chopped from the signal 28, 29 and 30 of FIGURE 1. In any case, the abscissa or coordinate axis of all three signals is not time but address position of the data carried by the drum 11.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A digital computer comprising a storage medium including means to present microimages on a surface of said storage medium, illuminating means about which said storage medium rotates to selectively render effective said microimages, means for effecting incremental rotation of said storage medium about said illuminating means to predetermined positions, means to control said incremental rotation means including a computer to provide signals to determine direction and extent of angular rotation of said storage medium to provide said predetermined positions of the storage medium, an address counter means, an electronic means for readout of the microimage selectively rendered effective by the angular rotation of said storage medium to said predetermined positions, said address counter means being operable by the signals from said computer and the electronic read out means, said address counter means including means to generate an error signal of a magnitude dependent upon difference in angular relation of the storage medium to the position predetermined by the signals from the computer, and said incremental rotation means being operable by said error signal to angularly rotate the storage medium to the predetermined position.

2. The combination defined by claim 1 including said illuminating means being positioned within said storage medium for directing an optical signal through said storage medium to selectively render said microimages effective, the incremental rotation means including motor means to incrementally position the surface of the storage medium relative to the electronic readout means, the electronic readout means being operable to receive the optical signal and convert the microimages selectively rendered effective to electronic readout signals for operating the address counter means to control said motor means so as to incrementally position the surface of the storage medium relative to the electronic readout means to predetermined positions.

3. The combination defined by claim 1 in which the storage medium includes a light permeable means having microimages on a surface thereof to provide bits of information stored thereon, the illuminating means being positioned within said light permeable means for directing light through said permeable means to selectively pickup the microimages and thereby the information stored on said permeable means, the electronic readout means being operable to translate the information provided by the microimages into electronic signals, motor means to incrementally position the light permeable means relative to the electronic readout means, means operable by the electronic signals of the electronic readout means to control said motor means so as to incrementally position the light permeable means and thereby the microimages to predetermined positions relative to the electronic readout means, and a display system operable to accept the electronic signals for reading.

4. The combination defined by claim 1 in which the storage medium includes a light permeable means having the microimages on a surface thereof to provide opaque and transparent bits of microinformation stored on said surface, the illuminating means being operable to direct light signals through said light permeable means to selectively pickup the microimages and thereby the information stored on said surface, the electronic readout means being operable to accept the information, said readout means further comprising a lens system for providing a linear magnification of the selected microimage, a photodetector, said lens system for focusing a magnified image of the selected microimage on to the photodetector, said photodetector transferring said information into an electronic signal, amplifying means for amplifying said electronic signal, and said electronic readout means including other means operable by said amplified electronic signal including a display means for reading said signal.

5. The combination defined by claim 4 in which said light permeable means comprises a glass drum having the microimages inscribed on a surface thereof, the illuminating means being positioned within said glass drum for directing the light signal through said drum to said lens system for focusing the magnified image of the selected microimage on to the photodetector, and means connecting the corresponding electronic signal thereafter effected by the photodetector through the amplifying means to the other means operable thereby for transferring the bits of microinformation from said drum into said display means for reading said signal.

References Cited

UNITED STATES PATENTS

| | | | |
|---|---|---|---|
| 3,226,697 | 12/1965 | Fumitsubo | 340—173 |
| 3,148,354 | 9/1964 | Schaffert | 340—173 |
| 3,148,355 | 9/1964 | Slitter | 340—173 |
| 3,201,763 | 8/1965 | Libaw | 340—173 |
| 3,084,334 | 4/1962 | Martin | 340—173 |

TERRELL W. FEARS, *Primary Examiner.*